US008559018B2

(12) United States Patent
Takeda et al.

(10) Patent No.: US 8,559,018 B2
(45) Date of Patent: Oct. 15, 2013

(54) DETECTION METHOD OF CRACK OCCURRENCE POSITION

(75) Inventors: Nobuo Takeda, Kashiwa (JP); Yasuo Hirose, Kakamigahara (JP)

(73) Assignees: The University of Tokyo, Tokyo (JP); Kawasaki Jukogyo Kabushiki Kaisha, Kobe-shi (JP)

(*) Notice: Subject to any disclaimer, the term of this patent is extended or adjusted under 35 U.S.C. 154(b) by 396 days.

(21) Appl. No.: 12/675,393

(22) PCT Filed: Aug. 25, 2008

(86) PCT No.: PCT/JP2008/002293
§ 371 (c)(1),
(2), (4) Date: Apr. 20, 2010

(87) PCT Pub. No.: WO2009/028164
PCT Pub. Date: May 3, 2009

(65) Prior Publication Data
US 2011/0063626 A1    Mar. 17, 2011

(30) Foreign Application Priority Data

Aug. 27, 2007    (JP) .................................. 2007-220255

(51) Int. Cl.
*G01B 11/16* (2006.01)
*G01B 11/14* (2006.01)
*G01N 21/00* (2006.01)

(52) U.S. Cl.
USPC .......... 356/614; 356/32; 356/73.1; 356/237.1; 356/239.2; 356/239.3; 385/12; 385/13

(58) Field of Classification Search
USPC .............. 356/237.1–237.6, 614, 32, 34, 73.1, 356/239.2, 239.3; 398/13, 21; 385/12, 13; 250/559.42, 559.43, 227.14–227.18
See application file for complete search history.

(56) References Cited

U.S. PATENT DOCUMENTS 5,723,857 A * 3/1998 Underwood et al. .... 250/227.14
5,828,059 A * 10/1998 Udd .......................... 250/227.18
6,587,188 B2 * 7/2003 Gleine et al. .................... 356/32

(Continued)

FOREIGN PATENT DOCUMENTS

JP     05-340867     12/1993
JP     9-510293      10/1997

(Continued)

OTHER PUBLICATIONS

ISA Japan, International Search Report of PCT/JP2008/002293, Nov. 4, 2008, WIPO, 2 pages.

*Primary Examiner* — Gregory J Toatley
*Assistant Examiner* — Hina F. Ayub
(74) *Attorney, Agent, or Firm* — Alleman Hall McCoy Russell & Tuttle, LLP

(57) ABSTRACT

A surface layer formed of a composite material is stacked on the surface of a core layer formed of a foam synthetic resin material, and an arrester portion is provided in an interface region between the surface layer and the core layer to prevent the progression of delamination between the surface layer and the core layer. Optical fibers with grating portions are embedded inside the arrester and along the surface layer, and the spectra of reflected light from the optical fibers are compared to detect the occurrence position of a crack between the surface layer and the core layer.

2 Claims, 4 Drawing Sheets

(56) References Cited

U.S. PATENT DOCUMENTS

| | | |
|---|---|---|
| 7,488,929 B2 * | 2/2009 | Townley-Smith et al. .................. 250/227.14 |
| 2003/0169956 A1 * | 9/2003 | Lange et al. .................... 385/12 |
| 2004/0222364 A1 * | 11/2004 | Kenny et al. ............. 250/227.14 |
| 2006/0268263 A1 * | 11/2006 | Kim .......................... 356/237.1 |

FOREIGN PATENT DOCUMENTS

| | | |
|---|---|---|
| JP | 2001-004440 | 1/2001 |
| JP | 2001-021384 | 1/2001 |
| JP | 2004-317436 | 11/2004 |
| JP | 2005-208000 | 8/2005 |
| JP | 2006-282046 | 10/2006 |

* cited by examiner (1)

L = 15.0 mm (2)

L = 10.2 mm (3)

L = 5.1 mm (4)

L = 2.4 mm (5)

L = 0.2 mm (6)

L = 0.09 mm

DETECTION METHOD OF CRACK OCCURRENCE POSITION

TECHNICAL FIELD

The present invention relates to a method for detecting the occurrence position of a crack the progression of which is arrested by an arrester portion.

BACKGROUND ART

In recent years, a foam core sandwich panel is used as a structural material for an aircraft body, rapid-transit rail car, and the like. This foam core sandwich panel is of a structure in which a surface layer, also referred to as a face plate, made of fiber reinforced plastic (abbreviated as FRP) is integrally formed on the surface of a core layer made of a foam synthetic resin material. The foam core sandwich panel has many advantages in that it is light in weight, gives high stiffness, prevents the intrusion of liquid such as water, and is moldable in one piece to reduce parts in number, but presents a problem that it is susceptible to delamination between the surface layer and the core layer.

Conventional art for preventing the delamination between the surface layer and the core layer is proposed, for example, in Japanese Laid-Open Patent Application Publication No. 2006-282046. This prior art proposes to provide an arrester between a face plate forming the surface layer and a core material forming the core layer to retard the progression of a crack by this arrester and prevent the delamination between the face plate and the core material.

DISCLOSURE OF THE INVENTION

Problem to be Solved by the Invention

The above prior art makes it possible to retard the progression of a crack that causes delamination, but in order to repair the crack, it is necessary to determine the position at which the crack occurred. However, there exists no technique to easily detect the occurrence position of a crack that occurred inside a member such as a foam core sandwich panel.

An object of the present invention is to provide a detection method of a crack occurrence position that enables an easy and accurate detection of the occurrence position of a crack inside a member.

Means to Solve the Problem

According to the present invention, there is provided a method of detecting a crack occurrence position which includes: stacking a surface layer formed of a composite material on a surface of a core layer formed of a foam synthetic resin material; providing an arrester portion in an interface region between the surface layer and the core layer to arrest progression of delamination between the surface layer and the core layer; embedding a plurality of optical fibers respectively having grating portions inside the arrester portion and along the surface layer; and comparing spectra of reflected light from the optical fibers to detect an occurrence position of a crack between the surface layer and the core layer.

Furthermore, according to the present invention, the optical fibers are respectively provided at both end portions of the arrester portion along the surface layer.

Effect of the Invention

According to the present invention, the crack occurring position can be detected by embedding a plurality of optical fibers respectively having grating portions in an arrester portion and comparing the spectra of reflected light from the optical fibers.

Such detection of a crack occurrence position is based on the finding that as a crack tip comes near the arrester, the stress in the arrester portion increases. Upon generation of non-axially symmetric strain in the grating portion of each optical fiber, different refractive indices are generated in two orthogonal principal stress directions. Therefore, the spectrum of the reflected light shows a distribution indicative of a different wavelength peak, and the position at which the crack is occurring can be determined from a difference of the stresses in the optical fibers.

Furthermore, according to the present invention, since the optical fibers are respectively provided at both end portions of the arrester portion along the surface layer, the optical fibers are disposed at positions where the stress in the arrester portions caused by a crack is not dispersed. Therefore, a stress change is reflected in the change of strain of each optical fiber, leading to an improvement in the detection sensitivity of a crack as well as in the detection accuracy of a crack occurrence position.

BEST MODE FOR CARRYING OUT THE INVENTION

Figure 1:
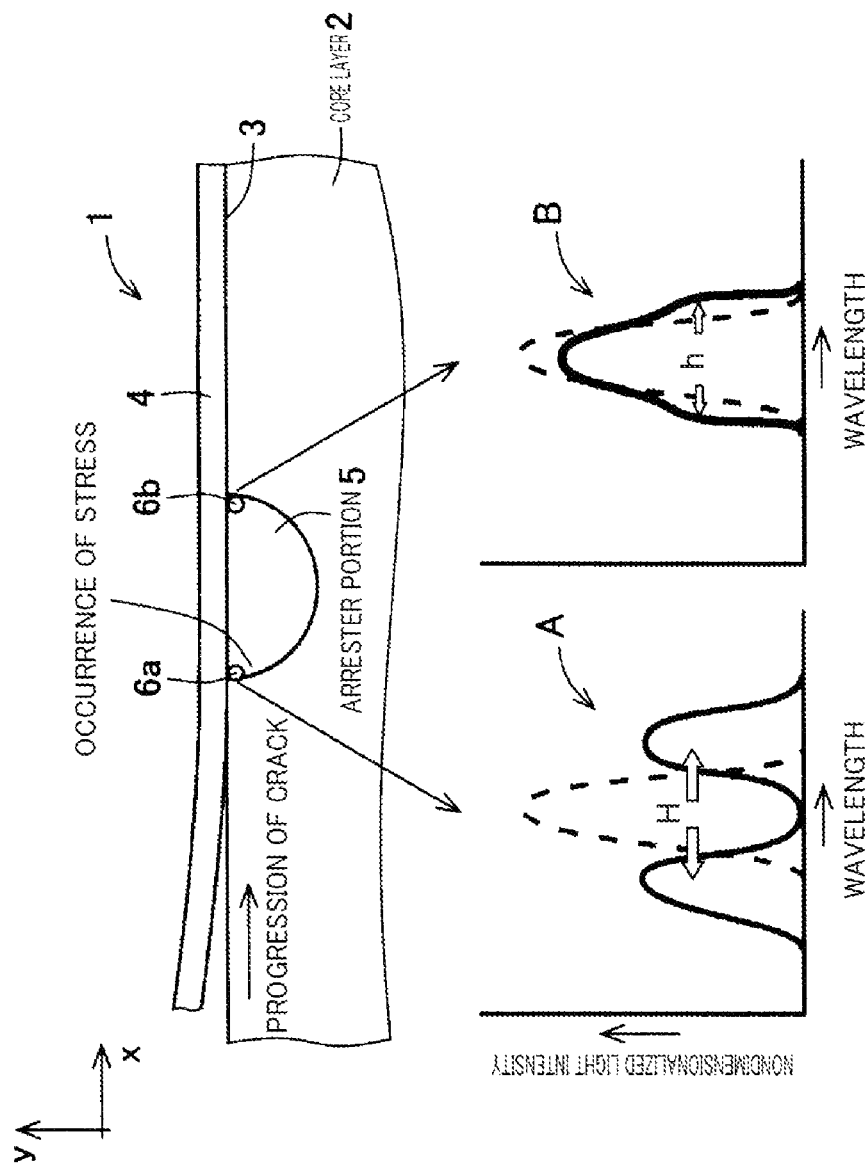
FIG. 1 is a view explaining the principles of the detection method of a crack occurrence position according to one embodiment of the present invention.

FIG. 1 is a view explaining the principles of the detection method of a crack occurrence position according to one embodiment of the present invention. The detection method of a crack occurrence position of the present embodiment is carried out for detecting a crack occurrence position in a foam core sandwich panel 1 used for structure of an aircraft body, rapid-transit rail car, or the like. In the foam core sandwich panel 1, a surface layer 4 formed of a composite material is stacked on the surface 3 of a core layer 2 formed of a foam synthetic resin material, and an arrester portion 5 is provided in an interface region between the surface layer 4 and the core layer 2 to arrest the progression of delamination between the surface layer 4 and the core layer 2.

The core layer 2, which is also referred to as a foam core, is formed of foam synthetic resin made, for example, of polyetherimide (abbreviated as PEI), polyvinyl chloride (abbreviated as PVC) or polymethacrylimide (abbreviated as PMI).

The surface layer 4 is formed of fiber-reinforced plastic (abbreviated as FRP). The fiber reinforced plastic is a composite material in which a base material of reinforcing fibers of approximately 10 μm in diameter extending to have orientations in three orthogonal axis directions is impregnated with a matrix resin. The reinforcing fibers may be carbon fibers or may be glass fibers, and an epoxy resin, for example, is used as the matrix resin.

A plurality (two in the present embodiment) of optical fibers 6a, 6b with grating portions are embedded inside the arrester portion 5 and along the surface layer 4, and comparison of spectra A, B of the reflected light from the optical fibers 6a, 6b enables detection of the occurrence position of a crack between the surface layer 4 and the core layer 2.

The optical fibers 6a, 6b each are constructed of a communications-type single-mode optical fiber with, for example, an 8.5 μm to 10 μm core outer diameter and 40 μm to 125 μm cladding outer diameter, and are respectively provided at both end portions of the arrester portion 5 along the surface layer 4. Upon generation of non-axially symmetric strain in these optical fibers 6a, 6b, different refractive indices are produced in two different orthogonal principal stress directions X and Y in the core of each respective optical fiber 6a, 6b. At this time, since the two grating portions forming polarization planes reflect independent lights of different wavelengths, the spectrum A of the reflected light from the optical fiber 6a disposed upstream in the progression direction of a crack (left side in FIG. 1) has two separate peaks and shows a noticeable bimodal characteristic.

As to the other optical fiber 6b disposed downstream in the progression direction of the crack, because of a smaller stress caused in the arrester portion 5 by the crack, the spectrum B of the reflected light from the optical fiber 6b does not show separate noticeable peaks, but is confirmed to have a broadened spectrum width and deformed spectrum shape.

Such shapes of the two spectra A and B are directly related to the three-dimensional stress states of the grating portions that are dependent on the distances L between the grating portions and the crack tip. For example, the interval H between the two separate peaks of the spectrum A is proportional to the difference of the normal stresses in the orthogonal principal stress directions X and Y, and is a function of the distance between the grating portion and the crack tip. In the case of spectrum B, the full-width at half maximum h of the spectrum (wavelength interval that gives a ½ value of the peak value) becomes the function of the distance L between the grating portion and the crack tip. Therefore, by presetting in a computer used for analysis the distance L between a grating portion and a crack tip as the function of the interval H between two separated peaks or of the full-width at half maximum h of a spectrum, i.e., as L=F(H) or L=F(h), the crack tip position can be detected.

Light is made incident from a wide band light source that uses an LED or the like to each optical fiber 6a, 6b, and the reflection light reflected at the grating portion is analyzed with an optical spectrum analyzer to obtain the spectrum A, B. The information on the spectrum is inputted into the above computer to enable the calculation of the crack occurrence position L.

In FIG. 1, the spectrum A, B obtained in correspondence with each optical fiber 6a, 6b is shown below the section of the foam core sandwich panel 1. Each optical fiber 6a, 6b, having such a grating portion, constitutes a fiber Bragg grating (abbreviated as FBG) sensor. The grating portion is a Bragg grating in which the refractive index of the core of the optical fiber 6a, 6b is periodically changed in the axis direction.

The grating portions, to mention by way of example, are 10 mm in length and approximately 530 nm in periodicity, and are formed at intervals of 50 mm to 300 mm in the extending direction of each optical fiber 6a, 6b. This interval is not limited to 50 mm to 300 mm and may be arbitrarily chosen such that grating portions are disposed at desired detection positions in accordance with the target structure or part thereof for which the occurrence position of a crack is to be detected.

Figure 2:
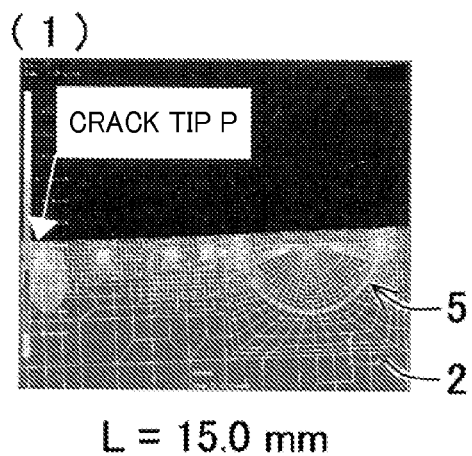
FIG. 2 is a view showing the changes in stress of an arrester portion 5 with the approach of a crack tip P.
Figure 2:
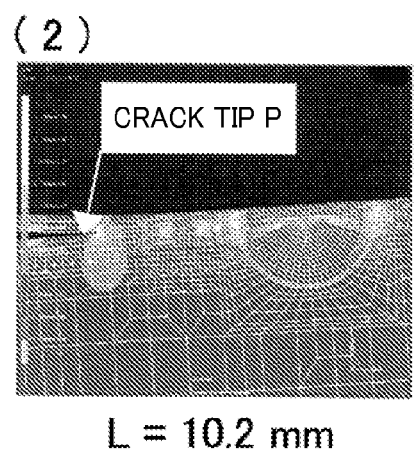
Figure 2:
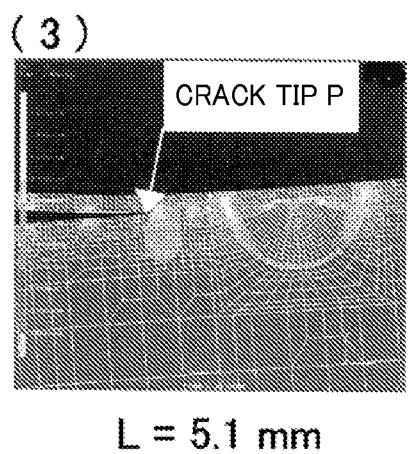
Figure 2:
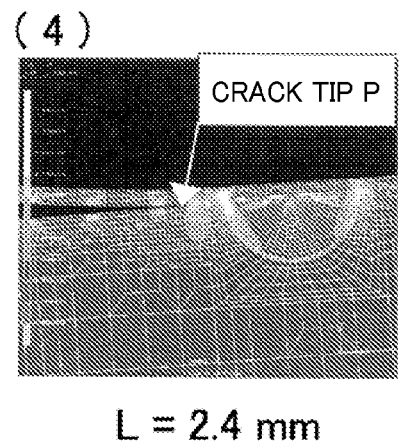
Figure 2:
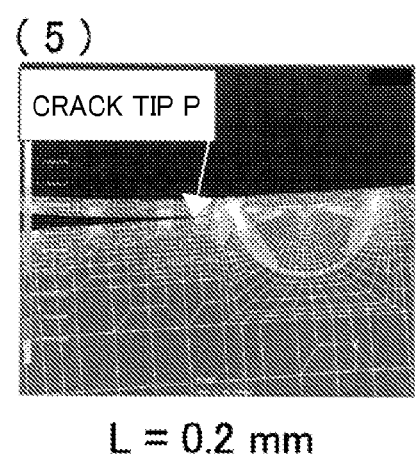
Figure 2:
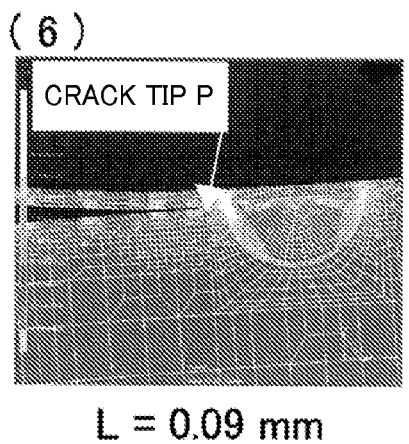

FIG. 2 is a view showing stress changes of the arrester portion 5 with the approach of a crack tip P. FIG. 2(1) shows the stress occurrence status of the arrester portion 5 when the crack tip P exists at the distance L of 15.0 mm from the arrester portion 5, FIG. 2(2) shows the stress occurrence status of the arrester portion 5 when the crack tip P exists at the distance L of 10.2 mm from the arrester portion 5, and FIG. 2(3) represents the stress occurrence status of the arrester portion 5 when the crack tip P exists at the distance L of 5.1 mm from the arrester portion 5. FIG. 2(4) shows the stress occurrence status of the arrester portion 5 when the crack tip P exists at the distance L of 2.4 mm from the arrester portion 5, FIG. 2(5) shows the stress occurrence status of the arrester portion 5 when the crack tip P exists at the distance L of 0.2 mm from the arrester portion 5, and FIG. 2(6) represents the stress occurrence status of the arrester portion 5 when the crack tip P exists at the distance L of 0.09 mm from the arrester portion 5.

In FIG. 2, the greater the stress in the arrester portion 5, the higher (whiter) the lightness is, and the smaller the stress, the lower (darker) the lightness is. As is apparent from the figure, the stress inside the arrester portion 5 becomes greater as the crack tip P comes closer to the arrester portion 5 so as to make the distance L smaller.

Figure 3:
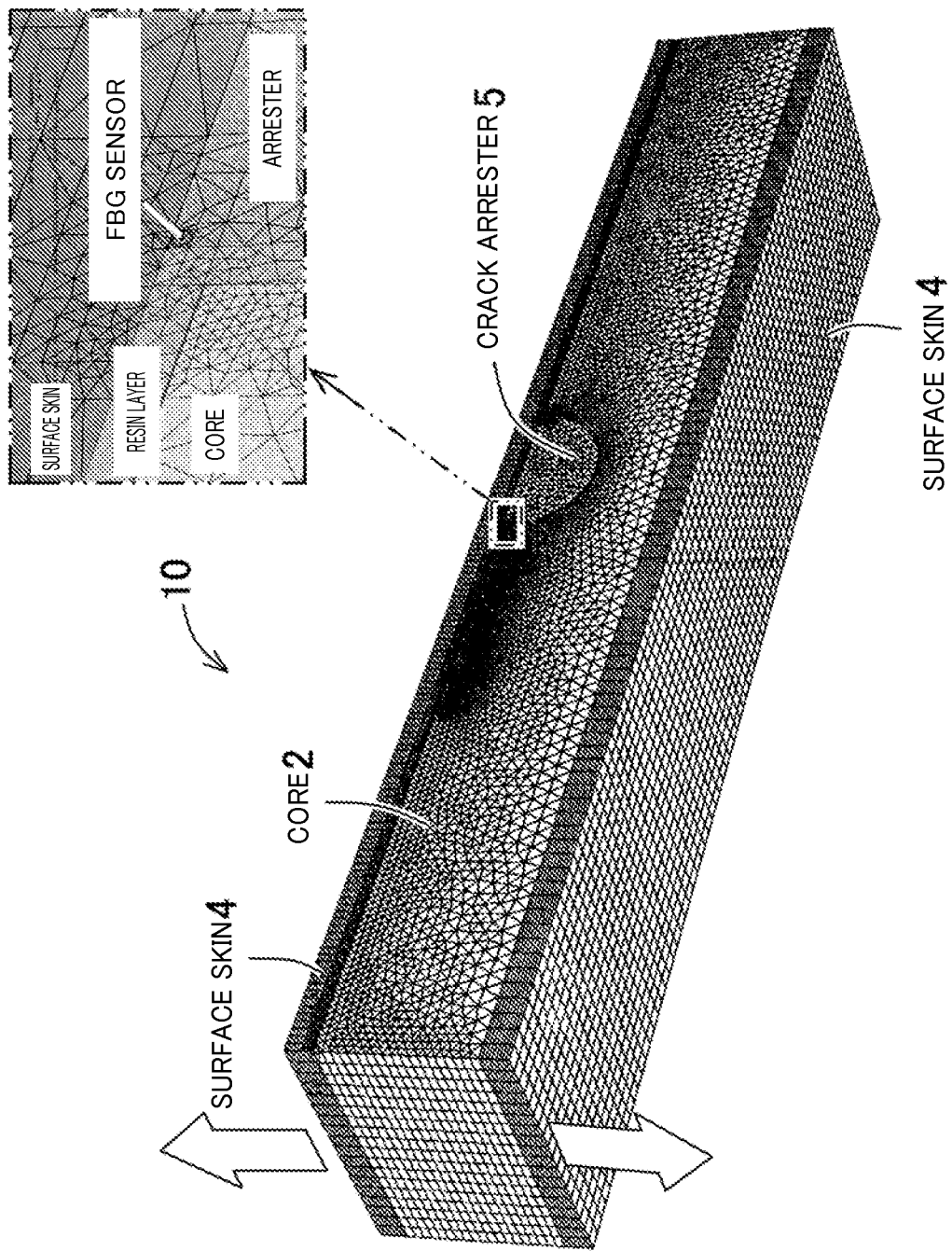
FIG. 3 is a view showing a finite element method (FEM) model of a foam core sandwich panel 1 with optical fibers 6a, 6b embedded in the arrester portion 5.
Figure 4:
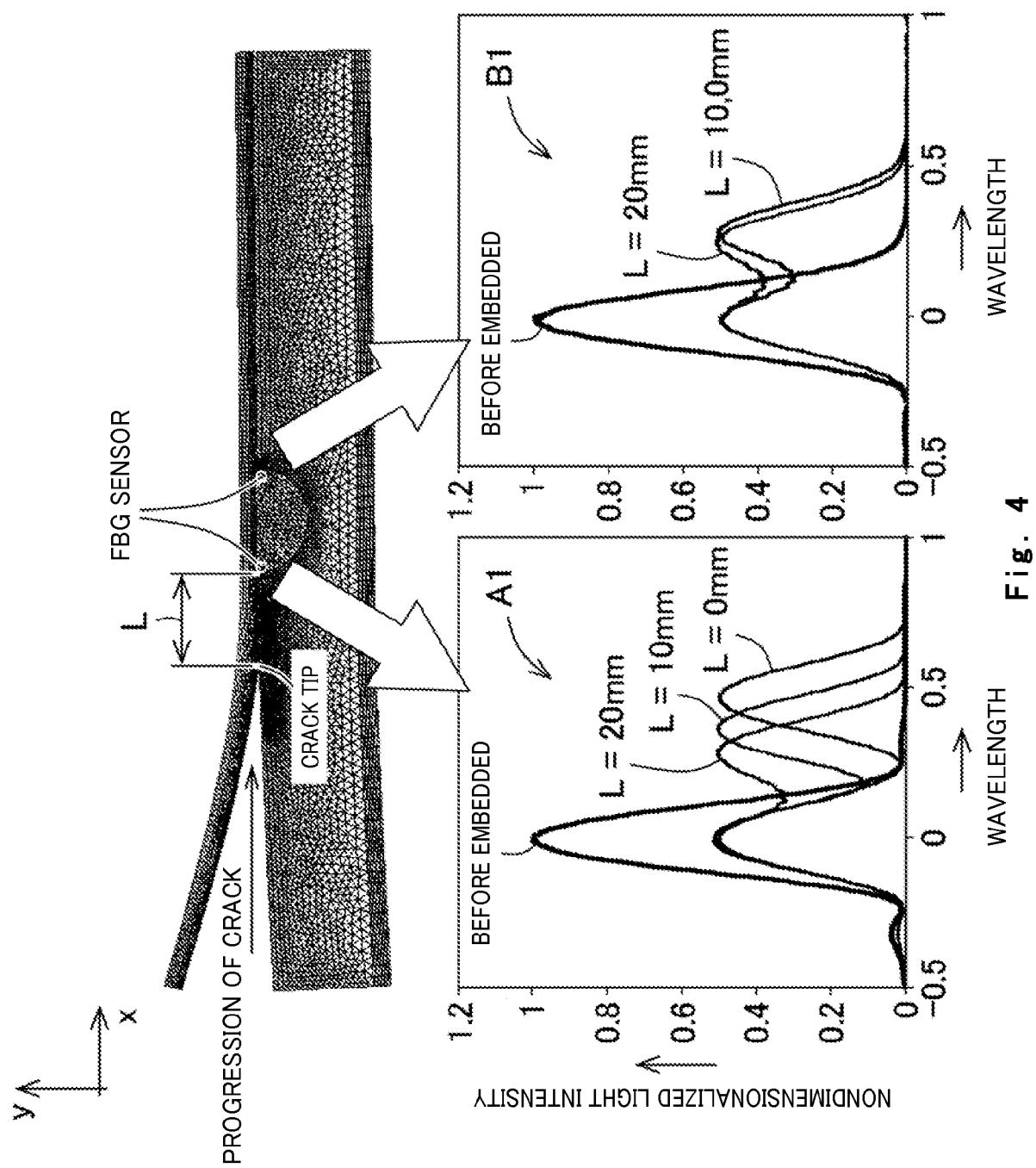
FIG. 4 is a view showing analysis results with the FEM model.

FIG. 3 is a view showing an FEM model of a foam core sandwich panel 1 with the optical fibers 6a, 6b embedded in the arrester portion 5, and FIG. 4 is a view showing spectra of the FGB sensors. The present inventor, in order to verify that the stress in the arrester portion 5 increases with the approach of a crack tip, simulated reflected light spectra at the time of a crack tip P approaching the upstream end of the arrester portion 5 in the crack progression direction using an FEM model 10 of a foam core sandwich panel 1 which is 180 mm in length, 35 mm in width and 26 mm in thickness and has a 10-mm radius arrester portion 5 of semicircular cross section with each optical fiber 6a, 6b embedded therein, and obtained the spectra A1, B1 of FIG. 4.

As a result, it has been verified that the crack occurrence position can be detected by making use of the phenomenon in which the peak of a reflected light spectrum moves according to the stress changes inside the arrester portion 5 with the approach of a crack.

As described hereinabove, according to the present invention, by embedding a plurality of optical fibers 6a, 6b having grating portions in the arrester portion 5 and comparing the spectra A, B of reflected light from the optical fibers 6a, 6b, the crack tip position at which the crack is occurring can be detected.

Such detection of a crack occurrence position is based on the finding that the stress in the arrester portion 5 increases with the approach of a crack tip P to the arrester portion 5. If non-axially symmetric strain arises in the grating portion of each optical fiber 6a, 6b, different refractive indices are generated in two orthogonal principal stress directions. Therefore, the spectrum of the reflected light, as shown in FIG. 1, shows a distribution indicative of a different wavelength peak, and the position where the crack is occurring can be determined from a difference of the stresses in the optical fibers 6a, 6b based thereon.

Additionally, since the optical fibers 6a, 6b are respectively provided at both end portions of the arrester portion 5 along the surface layer 4, the optical fibers 6a, 6b are disposed at positions where the stress in the arrester portion 5 caused by a crack is not dispersed. Therefore, a slight stress change is reflected in the change in strain of each optical fiber 6a, 6b, leading to an improvement in the detection sensitivity of a crack as well as in the detection accuracy of a crack occurrence position.

Since the progression range of a crack can thus be easily determined, a reduction can be made in the costs for inspection and repair. Furthermore, since the optical fibers 6*a*, 6*b* are embedded in the arrester portion 5, the crack occurrence position also exists at a known position where the arrester portion 5 exists, thereby enabling an easy and accurate determination of the crack occurrence position.

Furthermore, according to the detection method of a crack occurrence position as described above, even during service of an implemented object such as an aircraft or rapid-transit rail car constructed of a foam core sandwich panel with a crack the progression of which is suppressed by an arrester portion 5, monitoring can be performed. Therefore, if it is, for example, an aircraft, the service can be continued to an airport where the damage can be repaired to secure service safety, thereby enabling detection of a crack occurrence position without causing trouble in the service.

What is claimed is:

1. A method of detecting a crack occurrence position comprising:

stacking a surface layer formed of a composite material on a surface of a core layer formed of a foam synthetic resin material;

providing an arrester portion in an interface region between the surface layer and the core layer to arrest progression of delamination between the surface layer and the core layer;

embedding a first optical fiber having a first grating portion inside the arrester portion and along the surface layer such that the first optical fiber constitutes a fiber Bragg grating sensor, the first optical fiber being provided at one end portion of the arrester portion;

embedding a second optical fiber having a second grating portion inside the arrester portion and along the surface layer such that the second optical fiber constitutes a fiber Bragg grating sensor, the second optical fiber being provided at a second end portion of the arrester portion;

calculating a first distance between the first grating portion and a tip of a crack of the delamination approaching the arrester portion based on a shape of a spectrum of reflected light from the first optical fiber;

calculating a second distance between the second grating portion and the tip of the crack based on a shape of a spectrum of reflected light from the second optical fiber; and determining an occurrence position of the crack between the surface layer and the core layer based on the distances.

2. The method of detecting a crack occurrence position according to claim 1, further comprising:

presetting, in a computer, a relationship of the distance between the tip of the crack and each of the grating portions to an interval between two separated peaks of the spectrum or to a full-width at half maximum of the spectrum.

* * * * *